(12) United States Patent
Duesing et al.

(10) Patent No.: US 12,716,785 B2
(45) Date of Patent: Aug. 25, 2026

(54) METHOD FOR REAL-TIME ESTIMATION OF TEMPERATURES OF ELECTRIC COMPONENTS IN A POWER ELECTRONICS SYSTEM

(71) Applicant: HELLA GmbH & Co. KGaA, Lippstadt (DE)

(72) Inventors: Martin Duesing, Paderborn (DE); Alexander Happe, Warstein (DE); Michael Huelsewiede, Dortmund (DE); Andreas Wehrmann, Lippetal (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 304 days.

(21) Appl. No.: 18/521,593

(22) Filed: Nov. 28, 2023

(65) Prior Publication Data

US 2024/0094061 A1 Mar. 21, 2024

Related U.S. Application Data

(63) Continuation of application No. PCT/EP2021/064342, filed on May 28, 2021.

(51) Int. Cl.
*G01K 7/22* (2006.01)

(52) U.S. Cl.
CPC .................................... *G01K 7/22* (2013.01)

(58) Field of Classification Search
CPC ................................ G01K 7/22; G01K 7/425
See application file for complete search history.

(56) References Cited

U.S. PATENT DOCUMENTS

| | | | |
|---|---|---|---|
| 7,356,441 B2 * | 4/2008 | Kerkman ................ | H02M 7/00 702/182 |
| 2004/0128101 A1 * | 7/2004 | Hermerding, II ........ | G01K 7/42 374/E7.042 |
| 2007/0168151 A1 * | 7/2007 | Kernahan .............. | G01K 7/425 702/132 |
| 2011/0119018 A1 * | 5/2011 | Skarp ...................... | G01K 7/42 702/130 |
| 2013/0205151 A1 * | 8/2013 | Hsiao .................... | G06F 1/3234 713/323 |

FOREIGN PATENT DOCUMENTS

| | | | |
|---|---|---|---|
| EP | 1770851 A2 | 4/2007 | |
| WO | WO-2020217621 A1 * | 10/2020 | .............. H02P 29/60 |

OTHER PUBLICATIONS

International Search Report dated Feb. 18, 2022 in corresponding application PCT/EP2021/064342.

* cited by examiner

*Primary Examiner* — Peter J Macchiarolo
*Assistant Examiner* — Mireille S Sadate-Moualeu
(74) *Attorney, Agent, or Firm* — Muncy, Geissler, Olds & Lowe, P.C

(57) ABSTRACT

A method for real-time estimation of temperatures of electric components in a power electronics system, the method including the steps of: obtaining a current reference temperature; obtaining current power loss values of the electric components; determining self-heating coefficients of the electric components for the obtained current power loss values; determining external heating coefficients of the electric components; and estimating the temperatures of the electric components in real-time based on the obtained current reference temperature, the determined self-heating coefficients and the determined external heating coefficients.

9 Claims, 7 Drawing Sheets

METHOD FOR REAL-TIME ESTIMATION OF TEMPERATURES OF ELECTRIC COMPONENTS IN A POWER ELECTRONICS SYSTEM

This nonprovisional application claims priority under 35 U.S.C. § 119(a) to International Application No. PCT/EP2021/064342, which was filed on May 28, 2021, and which is herein incorporated by reference.

BACKGROUND OF THE INVENTION

Field of the Invention

The present invention relates to a method for real-time estimation of temperatures of electric components in a power electronics system, a power electronics system, a computer program product and a computer-readable storage medium.

Description of the Background Art

In power electronics systems, it may be required to determine the temperatures of their electrical components, to guarantee its functionality and avoid the risk of any damage by exceeding permissible temperatures. Furthermore, knowledge of the temperatures enables a higher utilization.

A separate measurement of the temperatures of each electrical component is not possible for all relevant components due to the small installation space and the high costs associated therewith. An additional limitation of the measurement on most of the electrical components is that it can only be done on the surface of the case and not on the critical spot inside it.

Generally, with a calculation of component temperatures, an estimation of the hottest spot can be done. There exist different approaches for the estimation of temperatures in power electronics, which are based on the calculation of temperatures with the specific thermal resistance and the specific thermal capacity.

However, the known approaches require large resources on the side of the computer, e.g., microcontroller, of the power electronics system. Typically, in power electronics system, large portions of the resources of the computer are allocated for main function processes of the power electronics system and available resources for other functions, such as for temperature estimation of components, are very limited on the computer. It is possible to provide a further computer or a computer having increased resources to solve this problem. But this has the disadvantages of increased costs, increased energy consumption, requirement of more installation space and production of more heat in the power electronics system.

SUMMARY OF THE INVENTION

It is therefore an object of the present invention to provide an improved method for real-time estimation of temperatures of electric components in a power electronics system, the method not having the disadvantages associated with the approaches known from the state of the art. The method should in particular be able to be executed in simple and low-cost power electronics systems and to deliver results being accurate enough to enable flawless functionality of the power electronics systems and thereby avoid any damage to the power electronics systems.

This object is solved by a method for real-time estimation of temperatures of electric components in a power electronics system, a power electronics system, a computer program product and a computer-readable storage medium. Further details of the invention unfold from the other claims as well as the description and the drawings. Thereby, the features and details described in connection with the method of the invention apply in connection with the power electronics system of the invention, with the computer program product and with the computer-readable storage medium of the invention, so that regarding the disclosure of the individual aspects of the invention it is or can be referred to one another.

According to a first aspect of the invention, the above object is solved by a method for real-time estimation of temperatures of electric components in a power electronics system. The method comprises the steps of: obtaining a current reference temperature; obtaining current power loss values of the electric components; determining self-heating coefficients of the electric components for the obtained current power loss values; determining external heating coefficients of the electric components; and estimating the temperatures of the electric components in real-time based on the obtained current reference temperature, the determined self-heating coefficients and the determined external heating coefficients.

Accordingly, the method of the invention enables real-time estimation of temperatures of electric components using self-heating coefficients based on power loss of the electric components and external heating coefficients in a simple and low-cost power electronics system. The method is accurate due to the correlation between the power loss values and the self-heating coefficients being taken into account for the estimation and further the external heating being taken into account by means of the determined external heating coefficients.

For a dynamic system, it is mostly interesting to do temperature estimation in real-time, to be able to react to critical temperatures at any time. For the real-time simulation proposed by the method of the invention, no modelling of the electric components is necessary, since all relevant information may be based in the self-heating coefficients and the external heating coefficients. As will be explained later, the coefficients may be generated by a simulation and/or a measurement.

The self-heating reflects the heating due to power loss of the electric components. Accordingly, the individual self-heating coefficients of the electric components are associated with the individual power loss values of the electric components.

The external heating reflects the heating of individual electric components due to neighboring electric components radiating heat and thereby externally heating these individual electric components. Neighboring electric components are understood herein as electric components located in close proximity to each other.

The method of the invention has the advantage that only one current reference temperature needs to be obtained, e.g., by means of measurement and/or simulation. The current reference temperature may be measured by an NTC thermistor of the power electronics system, for example. The reference temperature may be an ambient temperature, for example. The method further requires obtaining of the current power loss values of the electric components, which may also be done by measurement and/or simulation, for example.

The steps of the method may be executed in a different order than the order in which the steps are recited. In other words, the method of the invention is not limited to the above recited order of steps but the steps may be executed in any technically viable order.

The self-heating coefficients may be determined from simulation data. The simulation data may be from an upfront simulation, in particular from a computational fluid dynamics simulation. Additionally, or alternatively, the self-heating coefficients may be determined from measurement data. The measurement data may be from an upfront measurement. Also, or alternatively, the external heating coefficients may be determined from simulation data, which may be from an upfront simulation, in particular from a computational fluid dynamics simulation. Additionally, or alternatively, the external heating coefficients may be determined from measurement data, which may be from an upfront measurement.

In other words, one or both of the self-heating coefficients and the external heating coefficients may be precalculated by previous simulation(s) and/or previous measurement(s). In other words, the self-heating coefficients and/or the external heating coefficients may not at all or at least not in real time be calculated on the power electronics system but the coefficients may be stored thereon, in particular as functions and/or at least one look-up table. The computer, e.g., a microcontroller, of the power electronics system may for the obtained current power loss values simply determine the precalculated self-heating coefficients from the simulation data and/or the measurement data. Similarly, the computer of the power electronics system may determine the precalculated external heating coefficients from the simulation data and/or the measurement data.

Accordingly, the method may provide real-time estimation of temperatures using the self-heating and external-heating coefficients, wherein the calculation effort is outsourced into the simulation and/or the measurement performed beforehand. A significant reduction of the resource usage is a result of this process, which allows an estimation in real-time of the component temperatures in a power electronics system for a large number of components and having only little computational resources. Also, the method may thereby provide an absolutely determined setup in contrast to the known approach of using the specific thermal resistance and specific thermal capacity.

The determined external heating coefficients may be of the same value for all of the electric components or of individual values for each one of the electric components. The value or values of the external heating coefficients may be independent from the obtained power loss values. The external heating coefficients may be average values, which may in particular be precalculated. The averaging of the external heating coefficients results in some inaccuracy. However, the resource usage on the computer of the power electronics system may be reduced significantly and the available resources may rather be used for the self-heating coefficients, which have been found to be more critical with respect to accurate determination thereof for accurate real-time estimation of the temperatures of the electric components.

The method may further comprise real-time estimation of a temperature of at least one mechanical component of the power electronics system. In this case, since the mechanical component has no power loss, there is no self-heating taken into account. However, the external heating coefficient for the mechanical component and, optionally, other coefficients specific to the mechanic component may be taken into account, which may be precalculated. In other words, the heat from other components, in particular electric components, radiating towards the mechanical component may be taken into account. The mechanical component may be a heat sink, for example, or any other component that may be relevant for the operation of the power electronics system.

The power electronics system may be an electronic control unit, in particular of a vehicle. The electronic control unit in the vehicle may be any unit for electronically controlling a system of the vehicle, such as a steering or braking system, for example. The number of electronic control units used in vehicles is large and, depending on the system that is thereby controlled, e.g., steering or breaking of the vehicle, the safety requirements are very high. Accordingly, the invention provides a method that is executable on different electronic control units in vehicles, the method being cost-efficient and increasing the safety of the passengers in the vehicle by avoiding failure of electric components due to excessive heat in the electronic control unit.

The step of obtaining the current power loss values of the electric components may comprise square-edge approximation of the power loss over time for each one of the electric components such that the current power loss values are obtained for specified time steps. The square-edge approximation may be or include approximating the occurring power losses of the electric components as square wave signals. Thereby, continuously obtained or recorded power loss values over time may be simplified for later storing the power loss values as simple square waves over time, which may in particular be organized in specified time steps. The specified time steps may be time steps within a time grid of the time for which the power loss values are recorded or obtained. The result of the square-edge approximation for a single electric component accordingly may be that for each time step within the time grid, only one single power loss value of the electric component is obtained. This square-edge approximation may be performed for each one of the electric components of the power electronics system.

The step of obtaining the current power loss values of the electric components may further comprise decomposing the current power loss values of each one of the electric components for the specified time steps into power loss delta steps of each one of the electric components and storing the power loss delta steps. A power loss delta step as herein referred to is to be understood as a step or difference in power loss value from one power loss value to the next one or, in other words, from a power loss value at a specified time step to the power lass value at the consecutive or adjacent specified time step within the time grid. The decomposition of the power loss values into delta steps enables efficient usage of the storage available in the power electronics system.

Each one of the power loss delta steps for a specified time step may be stored in one of a predetermined number of storage locations. The number of storage locations may be predetermined such that one or more main functions of the power electronics system using other resources of the computer of the power electronics system may be guaranteed and the auxiliary function of temperature estimation may nonetheless be carried out on the computer without any conflict with the main function(s).

The oldest power loss delta steps may be deleted from the storage locations when the predetermined number of storage locations is full. Full can mean that every one of the available storage locations has a value of power loss delta step stored therein. This measure ensures that the predetermined number of storage locations or, in other words, available storage on the computer (chip) is not exceeded.

However, the value from the deleted power loss delta steps may be retained in the next power loss delta steps. For this purpose, the value of the deleted power loss delta steps may be added to the new or newest power loss delta steps at the current specified time step. Thereby, despite having the limited number of storage locations, it may be ensured that the information from the history is not lost for accurately estimating the temperature of the electric components.

A (transient) temperature due to self-heating may be determined for each one of the power loss delta steps of each one of the electric components. This may be done using the determined self-heating coefficients in the step of estimating the temperatures of the components.

The (transient) temperatures due to self-heating of all power loss delta steps at each specified time step may be summed up to obtain the (transient) temperatures at each one of the electric components. In other words, for each electronic component and for each specified time step, the temperatures due to self-heating are added up to obtain the temperature of that electric component for this specified time step. This may be done for all electric components to thereby estimate in real-time the temperatures due to self-heating of each one of the electric components.

To estimate the accurate or overall temperature of the electric components, the temperature effect based on the determined external heating coefficients may be added to the temperatures due to self-heating. Also, the obtained current reference temperature may be added. Such linear superposition may be used to estimate the temperature in real-time with little available resources in the power electronics system.

According to a second aspect of the invention, the initially stated object is solved by a power electronics system to carry out the method according to the first aspect of the invention.

The power electronics system may comprise a computer, such as a microcontroller, for carrying out the method. The power electronics system may be an electronic control unit, in particular of a vehicle, as has been previously explained. Also, the power electronics system may comprise a computer-readable storage medium and a computer program product stored thereon as will be explained in the following.

According to a third aspect of the invention, the initially stated object is solved by a computer program product comprising instructions which, when the program is executed by a computer, cause the computer to carry out the method according to the first aspect of the invention.

According to a fourth aspect of the invention, the initially stated object is solved by a computer-readable storage (medium) comprising instructions which, when executed by a computer, cause the computer to carry out the method according to the first aspect of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
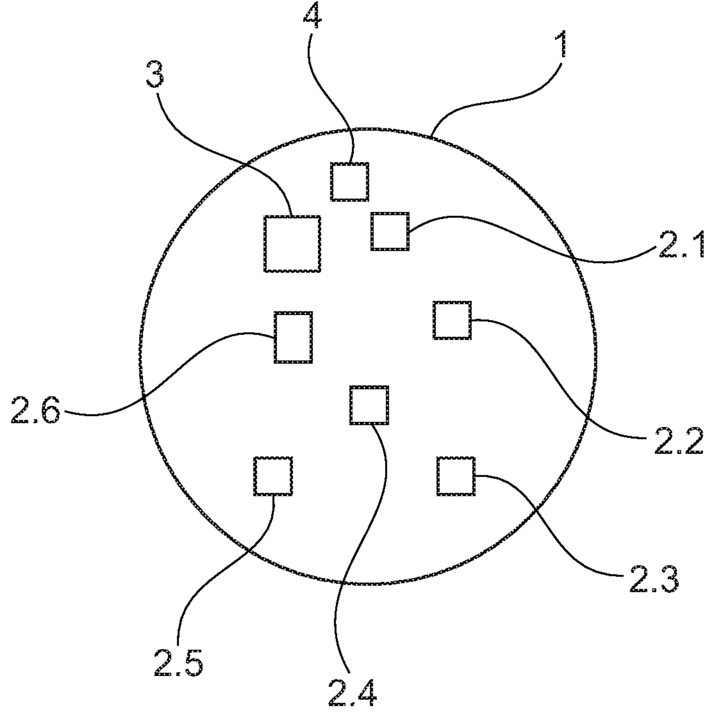
FIG. 1 is a printed circuit board of a power electronics system according to an example of the invention.

FIG. 1 shows a printed circuit board 1 as part of a power electronics system, which may be fora vehicle and has a main function of enabling steering of the vehicle, braking of the vehicle or any other functioning of the vehicle, for example. In other words, the printed circuit board 1 is an electronic component of the power electronics system.

Instead of a printed circuit board 1, other electronic components or the entire power electronics system may be designed as described in the following. The power electronics system may comprise further electrical and mechanical components such as a heat sink, housing, connectors and so on, for example.

The printed circuit board 1 comprises several electric components 2.1, 2.2, 2.3, 2.4, 2.5, 2.6, which may be different from one another and are supplied with power within the power electronics system. The power loss of these electric components 2.1, 2.2, 2.3, 2.4, 2.5, 2.6 results in a self-heating of the respective electric components 2.1, 2.2, 2.3, 2.4, 2.5, 2.6. Besides the self-heating, the electric components 2.1, 2.2, 2.3, 2.4, 2.5, 2.6 radiate heat towards adjacent or neighboring components 2.1, 2.2, 2.3, 2.4, 2.5, 2.6, which is herein referred to as external heating.

The printed circuit board 1 further comprises a computer 3, which may be in the form of a microcontroller, for example. The printed circuit board 1 further comprises a storage 4. Although the computer 3 and the storage 4 are shown as separate units, the computer 3 and storage 4 may be the same unit, e.g., provided on a single chip.

The invention is further described exemplary with reference to the printed circuit board 1 merely as one possible example of a portion or part of a power electronics system to which the method as presented below may be applied. That is, the invention may be applied to any power electronics system or part thereof, including one or more printed circuit boards 1 or any other electronic components.

Figure 2:
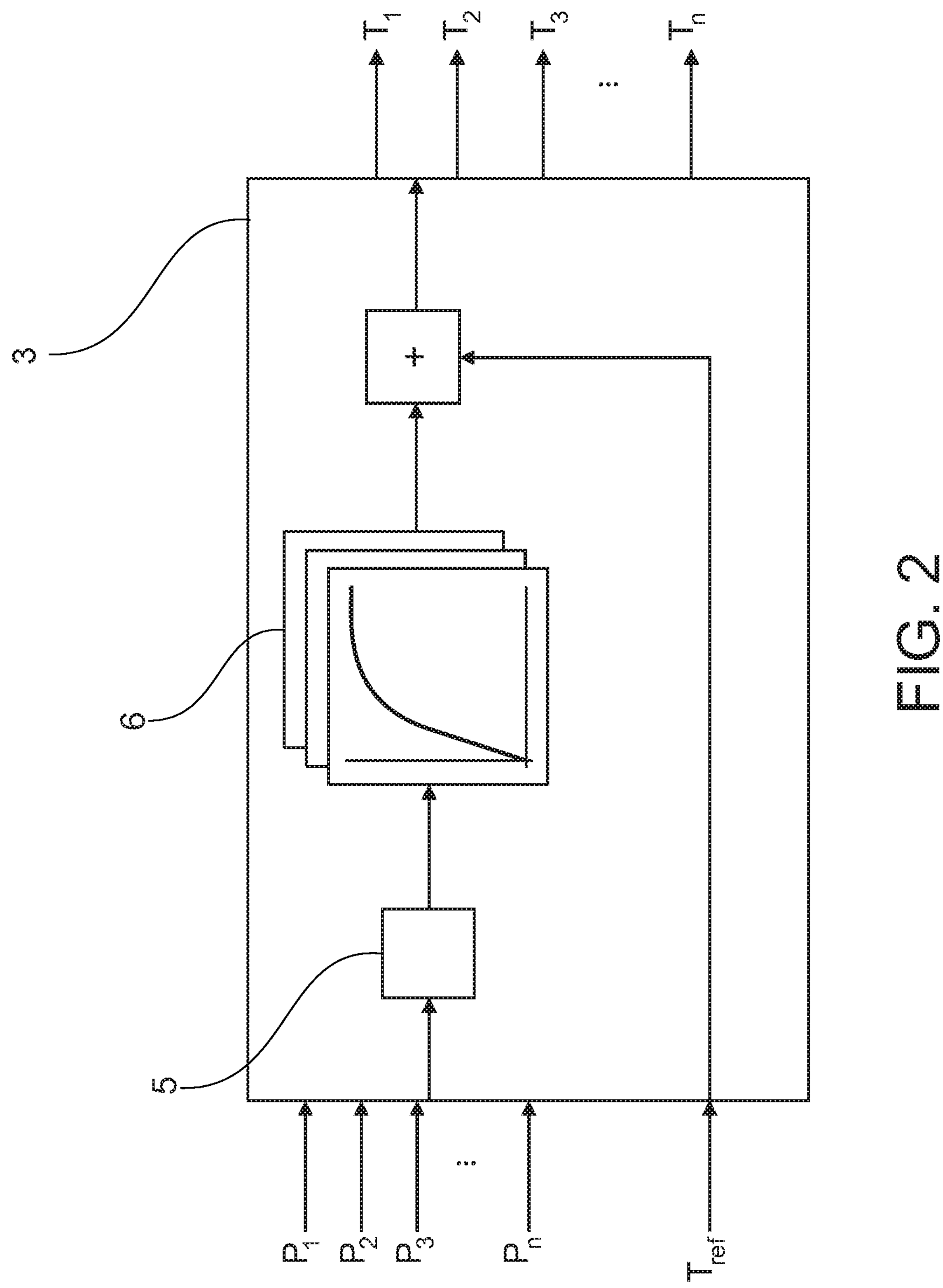
FIG. 2 is a schematic illustration of a method according to an example of the invention.
Figure 3:
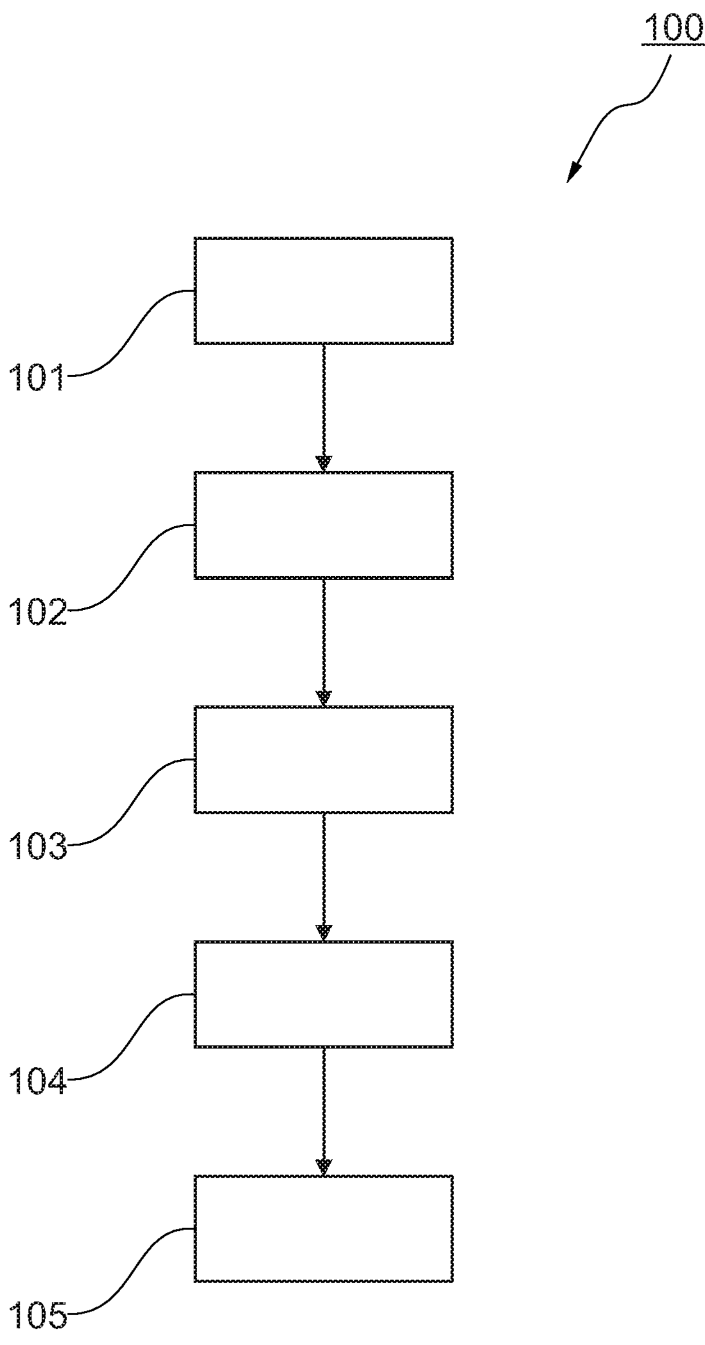
FIG. 3 is a further schematic illustration of the method of FIG. 2.

FIGS. 2 and 3 show schematic illustrations of a method 100 (see FIG. 3) executed by the computer 3 of the power electronics system. For this purpose, the storage 4 or computer-readable storage medium may have stored thereon a computer program product, which is executable by the computer 3. The computer program product may comprise instructions which, when the program is executed by the computer 3, cause the computer 3 to carry out the method 100.

In a first step 101 of the method 100, a current reference temperature $T_{ref}$ is obtained by the computer 3. This may in particular be done by means of a measurement at a single point of the power electronics system, in particular the printed circuit board 1. The measurement may be performed by an NTC thermistor of the power electronics system, for example. In this regard, FIG. 2 shows a black box schematic illustrating a computation scheme executed by the computer 3 and indicates how the current reference temperature $T_{ref}$ is obtained by the black box schematic executed by the computer 3.

In a second step 102 following the first step 101 of method 100, current power loss values $P_1$, $P_2$, $P_3$ . . . $P_n$ (see FIG. 2) are obtained for each one of the electric components 2.1, 2.2, 2.3, 2.4, 2.5, 2.6 of the printed circuit board 1. These power loss values $P_1$, $P_2$, $P_3$ . . . $P_n$ may be recorded by the individual electric components 2.1, 2.2, 2.3, 2.4, 2.5, 2.6, for example. Although the step 102 is referred to herein as a second step 102, the step 102 may as well be carried out prior to step 101.

In a third step 103, external heating coefficients 5 of the electric components 2.1, 2.2, 2.3, 2.4, 2.5, 2.6 are obtained. The external heating coefficients 5 are shown here schematically as a black box. For example, only one external heating coefficient 5 as a mean value may be used for all of the electric components 2.1, 2.2, 2.3, 2.4, 2.5, 2.6 or, alternatively, an individual external heating coefficient 5 may be used for every single one of the electric components 2.1, 2.2, 2.3, 2.4, 2.5, 2.6. The external heating coefficient(s) 5, which may be time-independent, may be predetermined from simulation data from an upfront simulation and/or from measurement data from an upfront measurement. It or they may be stored in the storage 4 and the computer 3 may merely have to look up the external heating coefficient(s) 5 for the given electric components 2.1, 2.2, 2.3, 2.4, 2.5, 2.6. Alternatively, step 103 may be carried out prior to step 101 or 102.

In a fourth step 104, following the step 103 of method 100, self-heating coefficients 6 of the electric components 2.1, 2.2, 2.3, 2.4, 2.5, 2.6 are determined for the obtained current power loss values $P_1$, $P_2$, $P_3$ . . . $P_n$. These self-heating coefficients 6 may be stored in the storage 4 as functions as it is being schematically shown in FIG. 3. The self-heating coefficients 6 may be predetermined from simulation data from an upfront simulation and/or from measurement data from an upfront measurement. They may be stored on the storage 4 and the computer 3 may apply the respective function, which may be time-dependent, for the given electric components 2.1, 2.2, 2.3, 2.4, 2.5, 2.6. Alternatively, step 104 may be carried out prior to step 103.

In a fifth and final step 105, the temperatures $T_1$, $T_2$, $T_3$ . . . $T_n$ of the electric components 2.1, 2.2, 2.3, 2.4, 2.5, 2.6 are estimated in real-time based on the obtained current reference temperature $T_{ref}$ and by means of adding thereto the temperature effect according to the determined external heating coefficients 5 and the determined self-heating coefficients 6. The means of estimating the temperatures $T_1$, $T_2$, $T_3$ . . . $T_n$ of the electric components 2.1, 2.2, 2.3, 2.4, 2.5, 2.6 may accordingly be described as linear superposition of the current reference temperature $T_{ref}$, the determined external heating coefficients 5 and the determined self-heating coefficients 6.

FIGS. 4 to 7 give more details on steps 102 and 104 illustrating graphs of power loss P, power loss delta step ΔP or temperature T over time for a single one of the electric components 2.1, 2.2, 2.3, 2.4, 2.5, 2.6 for which the temperature is being estimated according to the method 100.

Figure 4:
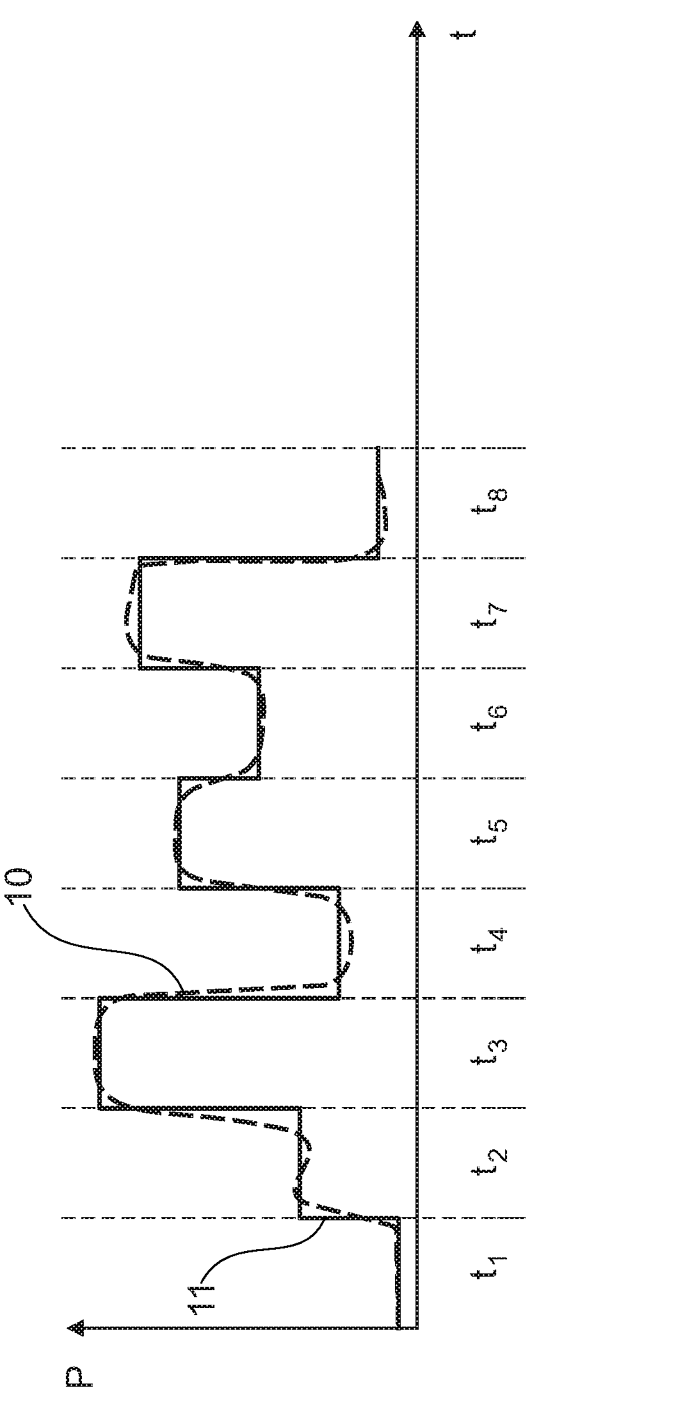
FIG. 4 is a graph of power loss of an electric component of the printed circuit board of FIG. 1 over time.

FIG. 4 shows how the power loss values P are obtained for a single one of the electric components 2.1, 2.2, 2.3, 2.4, 2.5, 2.6. As described above, the power loss P is recorded over time t. The power loss P follows a power loss curve 10 over time t depending on the power loss P on the electric component 2, which may depend on its operation, in particular whether it is being switched on or off, for example. The power loss curve 10 requires a significant amount of storage space to be stored on the storage 4, which may not be available.

Therefore, as may be seen in FIG. 4, the power loss curve 10 is approximated through square-edge approximation. The received square-edge approximation curve 11 provides distinct power loss values P for the illustrated specified time steps $t_1$ . . . $t_8$ is of a time grid. In other words, time steps of specified duration are defined and for each one of these time steps one single power loss value P is approximated from the power loss curve 10. This significantly reduces the amount of storage spaced needed to have the power loss values P stored therein. This comes at the cost of having less precise data. However, as may be seen in FIG. 4, this approximation delivers sufficiently precise results for the present application because the power loss value P does not need to be known continuously.

Figure 5:
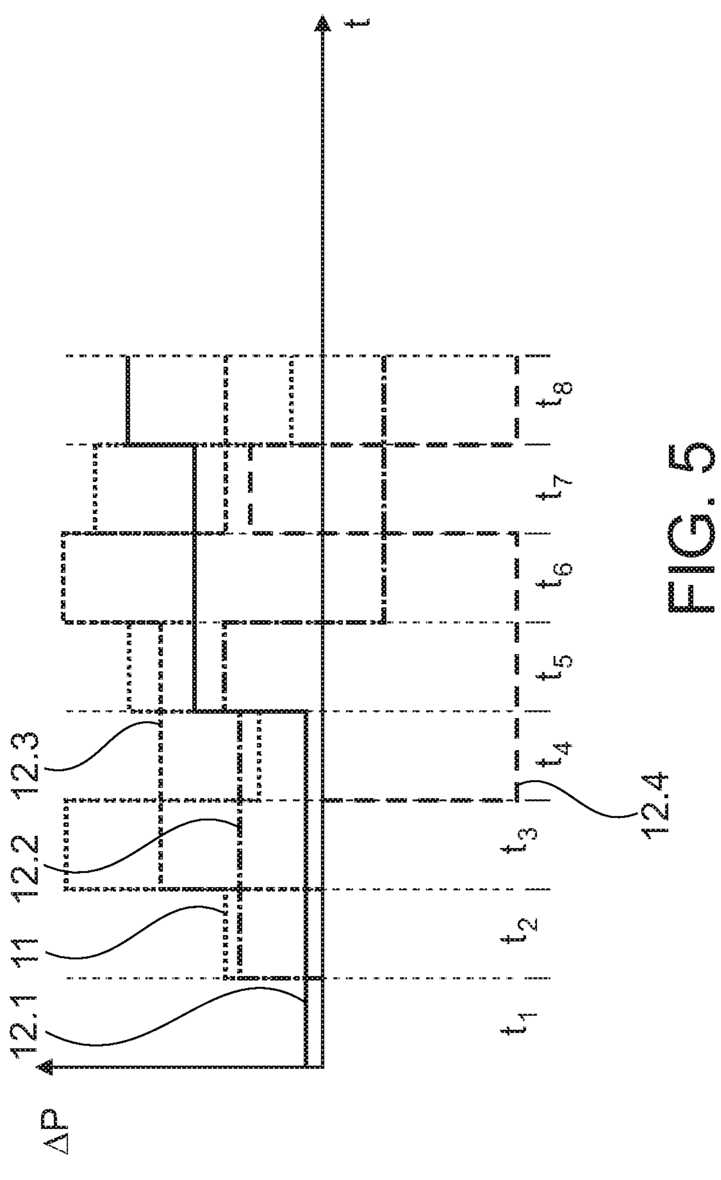
FIG. 5 is a graph of power loss delta stops of an electric component of the printed circuit board of FIG. 1 over time.

FIG. 5 shows how information of the obtained power loss values P are stored for the specified time steps tin a predetermined number of storage locations for each one of the time steps t. Here, it is exemplary assumed that the number of storage locations is four, although in reality the number may be much higher. Accordingly, the storage 4 may store for four time steps t an information of the corresponding power loss value P.

If the power loss values P from the square-edge approximation curve 11 (shown also in FIG. 5) themselves would be stored, this would require deleting the oldest power loss values P. Thereby, valuable information would be lost, which is needed to accurately estimate the temperature T due to self-heating of the considered electric component 2. That is because the information about a current power loss at a certain time itself is not sufficient to estimate the temperature T due to self-heating of an electric component 2. Instead, the history of power loss values P starting from a steady or starting state is required to actually be able to estimate how the temperature T due to self-heating has increased or decreased.

That is why in step 102, the current power loss values P obtained from the square-edge approximation curve 11 are decomposed into power loss delta steps ΔP for each one of the specified time steps t. The power loss delta steps ΔP do not reflect the total power loss P at the component for a given time step t but indicate the change from one time step t to another time step t.

For example, see the power loss delta step ΔP for time step $t_1$. It corresponds to the power loss value P of the square-edge approximation curve 11. The value of the power loss delta step ΔP for specified time step $t_1$ is stored in storage location 12.1 indicated as a continuous line in the graph of FIG. 5. This value is stored for four time steps $t_1$ to $t_4$ because there are four storage locations 12.1 to 12.4 as indicated above.

But for the time step $t_2$ following time step $t_1$, the power loss delta step ΔP actually is lower than the power loss value P from the square-edge approximation curve 11. That is because the power loss delta step ΔP only indicates the change in power loss value P of the square-edge approximation curve 11. Accordingly, the power loss delta step ΔP in time step $t_2$ is defined as the difference between the power loss values P of time steps $t_1$ and $t_2$. The value of the power loss delta step ΔP in time step $t_2$ is now stored in the second storage location 12.2 indicated as a dashed/dotted line in the graph of FIG. 5.

As mentioned above, there are four storage locations 12.1, 12.2, 12.3, 12.4 in the storage 4 of the power electronics system assigned to the time steps tin the time grid. The same principle of storing the values of power loss delta steps ΔP as described above is applied to the other storage locations 12.3, 12.4 such that only the differences in power loss value P from one time step t to the other time step t are stored therein as values.

Then, once the storage locations 12.1, 12.2, 12.3, 12.4 are full, i.e., a power loss delta step ΔP value is stored in every one of these, for the next specified time step t, in the case of FIG. 5: $t_5$, the oldest power loss delta step ΔP value is deleted from the first storage location 12.1 or overwritten by the power loss delta step ΔP value of time step $t_5$. Accordingly, the power loss delta step ΔP value from the square-edge approximation curve 11 for time step $t_5$ is stored in the storage location 12.1 instead of the power loss delta step ΔP value of time step $t_1$. However, the previous value from the power loss delta step ΔP in storage location 12.1 or, in other words, the value of the power loss delta step ΔP of time step $t_1$ may be added to the new value of power loss delta step ΔP of time step $t_5$ stored in the storage location 12.1. This may be seen in the graph of FIG. 5 at time step $t_5$. Normally, without retaining or adding the value of the power loss delta step ΔP from time step $t_1$, the value stored at storage location 12.1 in time step $t_5$ would be larger because the power loss delta step ΔP of the square-edge approximation curve 11 from time step $t_4$ to time step $t_5$ is larger. However, when the value of power loss delta step ΔP from time step $t_1$ is included, the value of power loss delta step ΔP stored in storage location 12.1 is actually less. Continuing with this scheme of deleting and retaining values of power loss delta steps ΔP in the storage 4, the history of power loss values P may be preserved in the storage with a small number of available storage locations 12 or, in other words, lithe available storage space.

Figure 6:
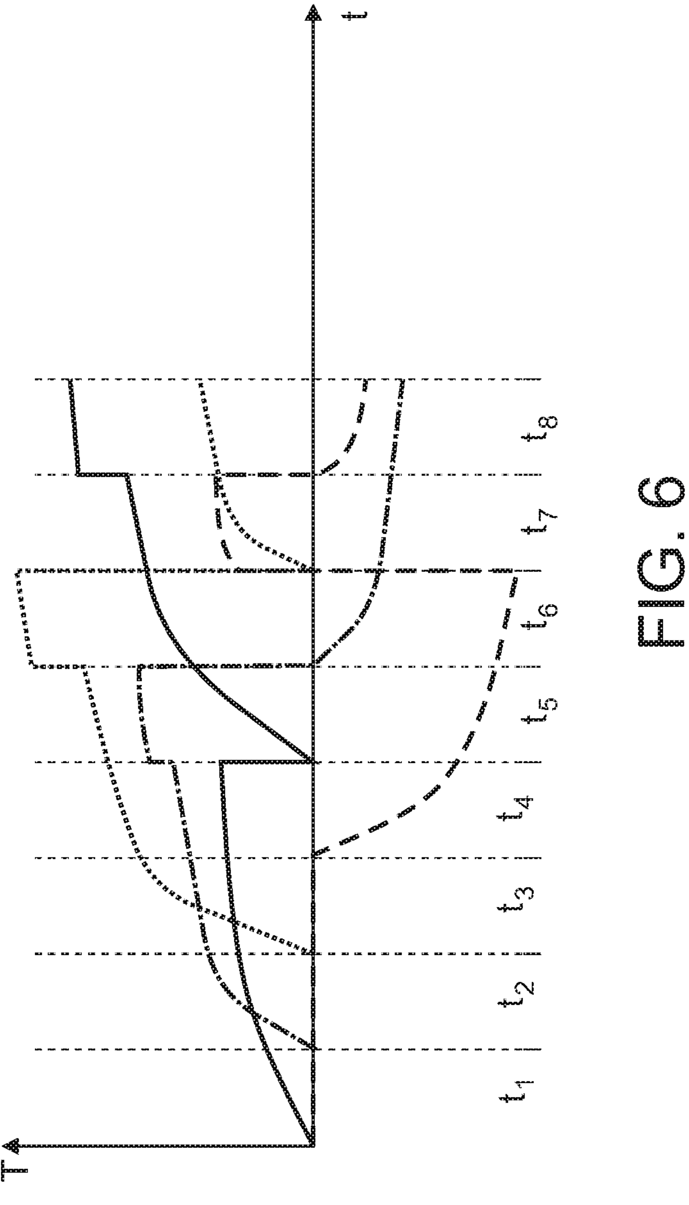
FIG. 6 is a graph of transient temperature of the electric component of the printed circuit board due to self-heating corresponding to the power loss delta steps of FIG. 5 over time.
Figure 7:
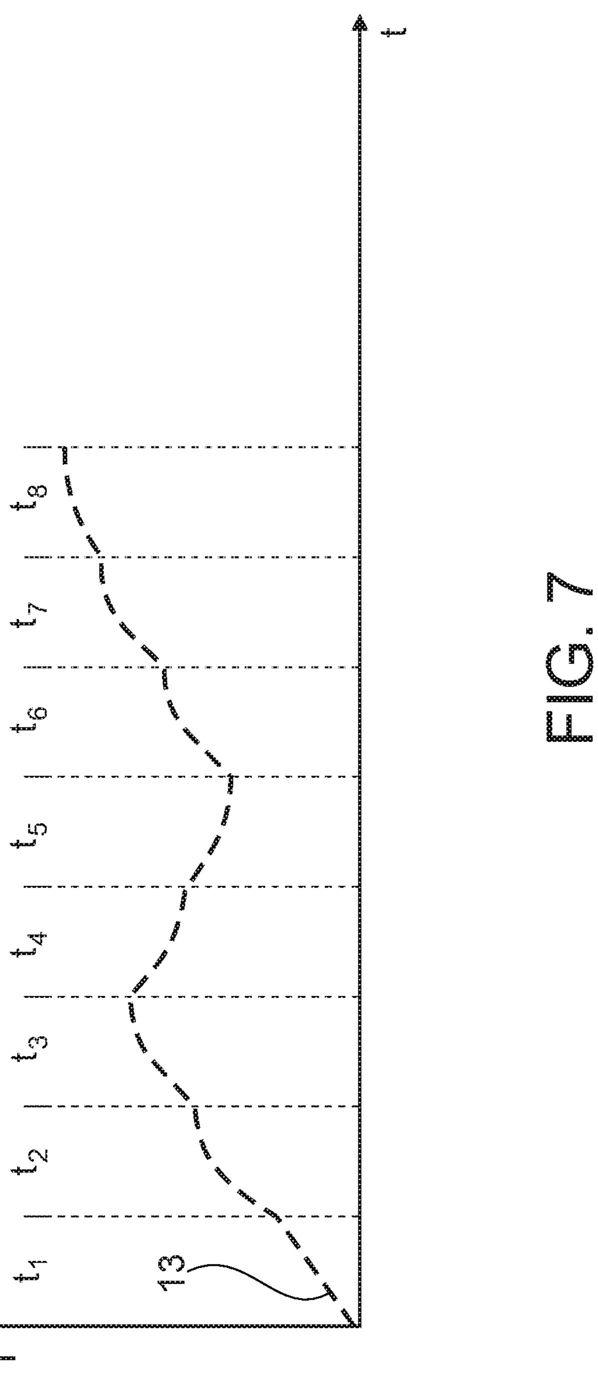
FIG. 7 is a graph of overall transient temperature of the electric component of the printed circuit board of FIG. 1 due to self-heating over time.

Then, as shown in FIG. 6, transient temperatures T are determined in step 104 for the power loss delta steps ΔP of the time steps t based on the thereto corresponding self-heating coefficients 6. Summing up these transient temperatures T for each one of the power loss delta steps ΔP of a time step t delivers a self-heating temperature curve 13 as shown in FIG. 7. The self-heating temperature curve 13 represents the estimated temperature T due to self-heating of the considered electric component 2.

As explained above, this temperature T due to self-heating is added to the reference temperature $T_{ref}$ and the temperature (effect) due to external heating to arrive at the estimation of overall temperature of the electric component 2 in real-time. Similarly, this process is carried out for the other electric components 2 to arrive at the estimation of overall temperature of these other electric components 2 of the power electronics system in real-time.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for real-time estimation of temperatures of electric components in a power electronics system, the method comprising:

obtaining a current reference temperature;

obtaining current power loss values of the electric components;

determining self-heating coefficients of the electric components for the obtained current power loss values;

determining external heating coefficients of the electric components; and estimating the temperatures of the electric components in real-time based on the obtained current reference temperature, the determined self-heating coefficients and the determined external heating coefficients, wherein the step of obtaining the current power loss values of the electric components comprises square-edge approximation of the power loss over time for each one of the electric components such that the current power loss values are obtained for specified time steps, wherein the step of obtaining the current power loss values of the electric components further comprises decomposing the current power loss values of each one of the electric components for the specified time steps into power loss delta steps of each one of the electric components and storing the power loss delta steps, wherein each one of the power loss delta steps for a specified time step is stored in one of a predetermined number of storage locations, wherein the oldest power loss delta steps are deleted from the storage locations when the predetermined number of storage locations is full, and wherein a value from the deleted power loss delta steps is retained in the next power loss delta steps.

2. The method according to claim 1, wherein the self-heating coefficients are determined from simulation data from an upfront simulation and/or from measurement data from an upfront measurement and/or the external heating coefficients are determined from simulation data from an upfront simulation and/or from measurement data from an upfront measurement.

3. The method according to claim 1, wherein the determined external heating coefficients are of the same value for all of the electric components or of individual values for each one of the electric components, and wherein the value or values of the external heating coefficients are independent from the obtained current power loss values.

4. The method according to claim 1, wherein the method further comprises real-time estimation of a temperature of at least one mechanical component of the power electronics system.

5. The method according to claim 1, wherein the power electronics system is an electronic control unit or an electronic control unit of a vehicle.

6. The method according to claim 1, wherein a temperature due to self-heating is determined for each one of the power loss delta steps of each one of the electric components.

7. The method according to claim 6, wherein the temperatures due to self-heating of all power loss delta steps at each specified time step are summed up to obtain the temperatures at each one of the electric components.

8. A power electronics system adapted to perform the method according to claim 1.

9. A non-transitory computer-readable storage medium storing a computer program thereon that, when executed by a computer, causes the computer to carry out the method according to claim 1.

* * * * *